United States Patent
Kalo et al.

(10) Patent No.: US 12,378,129 B2
(45) Date of Patent: Aug. 5, 2025

(54) LAYERED SILICATE PARTIALLY MODIFIED WITH AMINO ACID

(71) Applicant: BYK-Chemie GmbH, Wesel (DE)

(72) Inventors: Hussein Kalo, Landshut (DE); Maximilian Böhmer, Münster (DE); Udo Krappe, Wesel (DE); Nico Heitzer, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 0 days.

(21) Appl. No.: 18/571,953

(22) PCT Filed: Jul. 8, 2022

(86) PCT No.: PCT/EP2022/069099
§ 371 (c)(1),
(2) Date: Dec. 19, 2023

(87) PCT Pub. No.: WO2023/285308
PCT Pub. Date: Jan. 19, 2023

(65) Prior Publication Data
US 2024/0217829 A1   Jul. 4, 2024

(30) Foreign Application Priority Data
Jul. 12, 2021 (EP) .................................... 21185053

(51) Int. Cl.
*C09D 7/62* (2018.01)
*C01B 33/44* (2006.01)
*C08K 9/04* (2006.01)

(52) U.S. Cl.
CPC ................ *C01B 33/44* (2013.01); *C09D 7/62* (2018.01); *C01P 2002/20* (2013.01); *C08K 9/04* (2013.01)

(58) Field of Classification Search
CPC ........... C01B 33/44; C01B 33/38; C09D 7/62; C01P 2002/20; C08K 9/04
USPC ...................................................... 523/209
See application file for complete search history.

(56) References Cited

U.S. PATENT DOCUMENTS

| | | | |
|---|---|---|---|
| 3,325,340 A | 6/1967 | Walker | |
| 4,715,987 A * | 12/1987 | Rittler | C01B 33/20 501/148 |
| 5,780,376 A | 7/1998 | Gonzales et al. | |
| 11,358,874 B2 | 6/2022 | Kalo | |
| 2002/0058740 A1* | 5/2002 | Lorah | C08K 9/04 524/445 |
| 2005/0027058 A1* | 2/2005 | Dias | C08L 23/283 524/445 |
| 2007/0259992 A1 | 11/2007 | Tamura | |
| 2009/0233107 A1* | 9/2009 | Yamada | C01B 33/38 65/30.12 |
| 2011/0027601 A1 | 2/2011 | Ruffner, Jr. | |

FOREIGN PATENT DOCUMENTS

| | | |
|---|---|---|
| EP | 205281 | 12/1986 |
| JP | 57-030553 | 2/1982 |
| WO | 2006115729 | 11/2006 |
| WO | 2014164632 A1 | 10/2014 |
| WO | 2014164632 A8 | 10/2015 |
| WO | 2017133935 | 8/2017 |

OTHER PUBLICATIONS

International Search Report and Written Opinion for International Application No. PCT/ EP2022/069099 dated Sep. 14, 2022.
M. Daab et al., "Onset of Osmotic Swelling in Highly Charged Clay Minerals," Langmuir 2018, 34, 8215-8222.
Kunio Kajima and Nobutoshi Daimon, "Complex Formation between Synthetic Sodium Taeniolite and Amino Acids", Journa of the Chemical Society of Japan, Chemistry and Industrial Chemistry, 1974 (8), 1473-1479.

* cited by examiner

*Primary Examiner* — Hannah J Pak

(57) ABSTRACT

The invention relates to a layered silicate having interlayer cations, wherein the interlayer cations comprise a) inorganic monovalent cations comprising at least one of $Na^+$, $K^+$, and $Li^+$, and b) organic cations comprising at least one protonated amino acid.

14 Claims, No Drawings

LAYERED SILICATE PARTIALLY MODIFIED WITH AMINO ACID

The invention relates to a layered silicate having interlayer cations, to a process for preparing the layered silicate, to a composition comprising at least one binder and the layered silicate, and to the use of the layered silicate for improving the barrier properties of a polymer or coating layer.

EP 0205281 A describes the treatment of layered silicates with amino-carboxylic acids, which act as cell expanding agents. The resulting materials are described as gels. The gels may be formed to a desired shape to form objects.

U.S. Pat. No. 3,325,340 relates to a process of producing an aqueous suspension of vermiculite flakes, wherein crystals of vermiculite are treated with a solution containing a water-soluble salt of an ammonium cation to promote cross swelling of the crystals in a direction normal to the main cleavage plane of the crystals. In some embodiments, lysine and ornithine cations are used.

There is an ongoing need for layered silicates that easily delaminate into single clay lamellae, which provide good barrier properties, and which can be prepared by economically viable processes. It has been found that complete replacement of the inorganic interlayer cations of layered silicates with protonated amino acids do not delaminate into single clay lamellae easily or completely as desired. This detracts from the effectiveness of such materials for improving barrier properties.

The invention provides a layered silicate having interlayer cations, wherein the interlayer cations comprise
 a) inorganic monovalent cations comprising at least one of $Na^+$, $K^+$, and $Li^+$, and
 b) organic cations comprising at least one protonated amino acid,
wherein the molar ratio of the inorganic monovalent cations a) to organic cations b) is in the range of 0.20:0.80 to 0.80:0.20.

The layered silicate of the invention easily, and in many cases spontaneously, delaminates into single lamellae. The layered silicate can be prepared by economically viable processes.

The layered silicate can be prepared from various layered silicates having inorganic monovalent interlayer cations comprising at least one of $Na^+$, $K^+$, and $Li^+$. Examples of suitable layered silicates include vermiculite, beidellite, nontronite, volchonskoite, saponite, stevensite, sauconite, bentonite, montmorillonite, hectorite, the smectites, phlogopite, mica, and illite.

In some embodiments, the layered silicate is a naturally occurring layered silicate modified with a protonated amino acid.

In other embodiments, the layered silicate is a synthetic layered silicate.

In preferred embodiments, the layered silicate, prior to modification with organic cations, has the composition $Na_x[Mg_{3-z}Li_y]Si_4O_{10}(T)_2$, wherein
 x is in the range of 0.40 to 0.90,
 y is in the range of 0.00 to 0.90,
 z is in the range of 0.20 to 0.90,
 T independent of each occurrence represents F or OH, and $x+(3-z)+y \leq 4$.

In some embodiments at least 50%, or even at least 70%, or at least 90% of the occurrences T represents F. In some embodiments, T represents F in 100% of the occurrences.

The ratio of Na, Mg, and Li can vary within the ranges indicated above.

In preferred embodiments, the material contains lithium. In these embodiments, y is generally in the range of 0.20 to 0.70.

In further preferred embodiments, x is in the range of 0.55 to 0.80, y is in the range of 0.40 to 0.60, and z is in the range of 0.40 to 0.60.

In synthetic layered silicates other elements may be present in small amounts, depending on the purity of the starting materials. Examples of such elements include iron, calcium, aluminum, potassium, boron, copper, zinc, manganese, cobalt, nickel, vanadium, gallium, zirconium, and anions such as sulphate, chloride, phosphate, carbonate, and silicate.

In the layered silicate of the invention, the interlayer inorganic cations are less than completely exchanged by organic cations comprising at least one protonated amino acid. Amino acids are organic compounds that contain an amino group, generally a primary amino group, and a carboxylic acid group, along with a side chain, which may be a hydrocarbyl group, which optionally may contain further functional groups. The amino group may be located at the carbon atom adjacent to the carboxylic acid group (alpha amino acids). In other embodiments, the amino group and the carboxylic acid may be separated by two carbon atoms (beta amino acid), by three carbon atoms (gamma amino acids), by four carbon atoms (delta amino acids), or by even more carbon atoms. In preferred embodiments, the amino acid is an alpha amino acid. Examples of suitable amino acids include alanine, arginine, asparagine, aspartic acid, cysteine, glutamine, glutamic acid, glycine, histidine, isoleucine, leucine, lysine, methionine, phenylalanine, proline, serine, threonine, tryptophane, tyrosine, and valine. Alpha amino acids are chiral and they can occur in the L configuration or in the D configuration. For the purpose of the present invention, alpha amino acids in the L and D configuration are equally suitable. However, the naturally occurring alpha amino acids are generally present in the L configuration.

In preferred embodiments, the amino acid comprises at least one of lysine, ornithine, and β-alanine.

As mentioned above, in the layered silicate of the invention, the interlayer inorganic cations are less than completely exchanged by organic cations comprising at least one protonated amino acid. A less than complete exchange is defined as a degree of exchange which corresponds to less than 100% of the cation exchange capacity of the layered silicate before treatment with a protonated amino acid. The cation exchange capacity is suitably determined according to DIN EN ISO 11260:2017-04 using barium chloride.

In preferred embodiments, the molar amount of protonated amino acid corresponds to 20 to 85% of the cation exchange capacity of the layered silicate, more preferably 25 to 70% of cation exchange capacity. It is most preferred, that the molar amount of protonated amino acid corresponds 30 to 65% of the cation exchange capacity.

In further embodiments of the layered silicate of the invention, the molar ratio of the inorganic monovalent cations a) to organic cations b) is preferably in the range of 0.25:0.75 to 0.75:0.25, and more preferably in the range of 0.30:0.70 to 0.70:0.30.

In further preferred embodiments, the inorganic cations of alternating layers are exchanged by protonated amino acids in different degrees. For example, in some embodiments the interlayer cations between the layers alternately comprise more than 60 mole-% of organic cations b) and more than 60 mole-% of inorganic cations a). It is particularly preferred that the interlayer cations between the layers alternately comprise more than 70 mole-% of organic cations b) and more than 70 mole-% of inorganic cations a). The concept of ordered or semi-order interstratification of different cations within interlayers of layered silicate stacks describes an incidence of a statistically alternating cation occupancy of the interlayer spaces of a 2:1 phyllosilicate. This means that on average every second interlayer has the same kind of interlayer cations, and preferably the respective interlayer has only one kind of cation. By way of example, and in simplified terms, this means that a first interlayer contains only inorganic cations. In the next interlayer there is then, in turn, a different kind of a cation, such as an amino acid cation, for example. In idealized embodiments, the next interlayer is then identical again to the first interlayer, and the fourth interlayer is identical to the second. Because 2:1 layer silicates are materials of highly complex construction, defects may occur, and so the interstratification is also said to be ordered when a corresponding structure is present on statistical average. The presence of the interstratified phase is visible in the powder x-ray diffractogram by the appearance of a superstructure reflection. This has a d value which corresponds to the summated interplanar spacings of the fully exchanged phases. By way of example, and in simplified terms, this corresponds to the sum of the interlayer distance of the first and the second layer.

The delamination of partially modified layered silicate with amino acid can be identified via small angle x-ray scattering (SAXS). SAXS might be used to determine the d-spacing of a delaminated gel. Typically, due to delamination these d-spacings are >100 Å. SAXS data were measured using a "Double Ganesha AIR" system (SAXSLAB, Denmark). The X-ray source of this laboratory-based system is a rotating anode (copper, MicroMax 007HF, Rigaku Corporation, Japan) providing a micro-focused beam. The data are recorded by a position sensitive detector (PILATUS 300K, Dectris). Samples of delaminated amino acid-layer silicate were prepared by adding a defined amount of ultrapure water to the dry treated partially modified amino-acid-layered silicates, leading to gel-formation. After equilibration for one-week SAXS-patterns were recorded in 1 mm glass capillaries.

The invention also relates to a process for preparing the layered silicate. The process comprises
i) providing a layered silicate having interlayer cations, wherein the interlayer cations comprise inorganic monovalent cations comprising at least one of $Na^+$, $K^+$, and $Li^+$,
ii) determining the cation exchange capacity of the layered silicate,
iii) contacting the layered silicate with a protonated amino acid in an aqueous environment, wherein the molar amount of protonated amino acid corresponds to less than 100% of the cation exchange capacity of the layered silicate, wherein the amount of protonated amino acid corresponds to 20 to 80% of the cation exchange capacity of the layered silicate.

For layered silicate to be provided in step i) of the process the same considerations apply as described above. In preferred embodiments, the layered silicate, prior to modification with organic cations, has the composition $Na_x[Mg_{3-z}Li_y]Si_4O_{10}(T)_2$, wherein
x is in the range of 0.40 to 0.90,
y is in the range of 0.00 to 0.90,
z is in the range of 0.20 to 0.90,
T independent of each occurrence represents F or OH, and $x+(3-z)+y \leq 4$.

In some embodiments at least 50%, or even at least 70%, or at least 90% of the occurrences T represents F. In some embodiments, T represents F in 100% of the occurrences.

The ratio of Na, Mg, and Li can vary within the ranges indicated above.

In preferred embodiments, the material contains lithium. In these embodiments, y is generally in the range of 0.20 to 0.70.

In further preferred embodiments, x is in the range of 0.55 to 0.80, y is in the range of 0.40 to 0.60, and z is in the range of 0.40 to 0.60.

In synthetic layered silicates other elements may be present in small amounts, depending on the purity of the starting materials. Examples of such elements include iron, calcium, aluminum, potassium, boron, copper, zinc, manganese, cobalt, nickel, vanadium, gallium, zirconium, and anions such as sulphate, chloride, phosphate, carbonate, and silicate.

When the layered silicate is a synthetic layered silicate, the layered silicate is suitably prepared by a process comprising the steps of
a) Providing a mixture comprising Na compounds, Mg compounds, Li compounds, and Si compounds, wherein the compounds are selected from carbonates, halides, and oxides, and wherein the molar ratio of Na:Mg:Li:Si is in the range of 0.4 to 0.9:2.1 to 2.6:0.0 to 0.9:4.0
b) Heating the mixture to a temperature above 1100° C. to form a homogeneous liquid,
c) Cooling the mixture to a temperature below 1000° C. during a period of at least 0.5 h.

In step a), a mixture of Na compounds, Mg compounds, Li compounds, and Si compounds is provided. The compounds are provided in the form of oxides, halides, or carbonates. In typical embodiments, alkali metal salts/alkaline earth metal salts, alkaline earth oxides and silicon oxides, preferably binary alkali fluorides/alkaline earth fluorides, alkaline earth oxides and silicon oxides, preferably LiF, NaF, $MgF_2$, MgO, quartz are used. In a further prepared embodiment, the material of the invention is prepared from mixture of sodium carbonate, lithium carbonate, magnesium oxide, magnesium fluoride, and silicon dioxide (quartz). The molar ratio of the starting compounds reflects the molar composition of the layered material prepared. Therefore, the molar ratio of the metal compounds used as starting materials is selected to arrive at the molar composition of the layered material as described above.

The relative proportions of the starting compounds may be, for example, from 0.4 to 0.6 mol of $F^-$ in the form of the alkali/alkaline earth fluorides per mol of silicon dioxide and from 0.4 to 0.6 mol of alkaline earth oxide per mol of silicon dioxide, preferably from 0.45 to 0.55 mol of $F^-$ in the form of the alkali/alkaline earth fluorides per mol of silicon dioxide and from 0.45 to 0.55 mol of alkaline earth oxide per mol of silicon dioxide, particularly preferably 0.5 mol of $F^-$ in the form of the alkali/alkaline earth fluorides per mol of silicon dioxide and 0.5 mol of alkaline earth oxide per mol of silicon dioxide.

Preferably, the starting compounds are of high purity. In a preferred embodiment, the individual starting compounds have a content of calcium oxide below 2.00% by weight. It is further preferred, that the individual starting compounds have a content of iron oxide below 0.05% by weight.

In step b), the mixture of starting compounds is heated to a temperature above 1100° C. to form a homogeneous liquid. Heating is preferably carried out in an open or closed crucible.

Typically, a high-melting crucible made of a metal that is chemically inert or slow to react, preferably of molybdenum or platinum, is used.

Heating is typically carried out in a high-frequency induction furnace. If needed, the crucible is protected from oxidation by a protecting atmosphere (e.g. argon), reduced pressure or a combination of both measures. For precious metals like Platinum this is not necessary.

In step b), the mixture is heated to a temperature above 1100° C. The temperature must be above the melting temperature of the reaction mixture in order to obtain a homogenous liquid. Generally, the temperature range in the second step is from 1100° C. to 1700° C., preferably from 1300 to 1600° C. Generally, the duration of this step is from 60 minutes to 240 minutes, preferably from 75 minutes to 180 minutes.

In step c), the mixture is cooled to a temperature below 1000° C. during a period of at least 0.5 h, preferably during a period of at least 2.0 hours. Thereafter, the material is usually allowed to cool to ambient temperature.

In the second step of the process of the invention, the cation exchange capacity of the layered silicate is determined. As described above, the cation exchange capacity is suitably determined according to DIN EN ISO 11260:2017-04 using barium chloride.

In the third step, the layered silicate is contacted with a protonated amino acid in an aqueous environment, wherein the molar amount of protonated amino acid corresponds to less than 100% of the cation exchange capacity of the layered silicate, wherein the amount of protonated amino acid corresponds to 20 to 80% of the cation exchange capacity of the layered silicate.

For the amino acids the same criteria and preferences apply as described above. In preferred embodiments, the amino acid comprises at least one of lysine, ornithine, and β-alanine. Treatment of the layered silicate with the protonated amino acid generally occurs in an aqueous environment. Suitably, the amino acid is protonated with an inorganic acid, such as hydrochloric acid, hydrobromic acid, sulfuric acid, or nitric acid or with an organic acid, such as acetic acid, oxalic acid, formic acid, carbonic acid, malic acid, citric acid, sulfonic acids.

In typical embodiments, the layered silicate is added to water or to an aqueous liquid comprising at least 70% by weight of water to form a slurry. Suitably, about 1 to 15% by weight of the layered silicate, calculated on the weight of water or aqueous liquid, is used. The protonated amino acid can be added to the water or aqueous liquid prior to addition of the layered silicate or after addition of the layered silicate. The amino acid can be added in protonated form, for example as a hydrochloride. Alternatively, the amino acid can be protonated in the aqueous liquid by addition of a suitable amount of an acid, such as hydrochloric acid, hydrobromic acid, sulfuric acid, or nitric acid. Examples of suitable organic acids include acetic acid, oxalic acid, formic acid, carbonic acid, malic acid, citric acid, and sulfonic acids. The pH of the aqueous phase suitably is in the range of 4-8.

Treatment of the layered silicate with the protonated amino acid is suitably carried out with stirring or agitation at a temperature in the range of 5° ° C. to 95° C. for a period of 10 minutes to 10 hours.

In general embodiments of the process, the amount of protonated amino acid corresponds to 20 to 80%, preferably 25 to 70%, and more preferably 30 to 65%, of the cation exchange capacity of the layered silicate.

After treatment with the protonated amino acid, the layered silicate may optionally be separated from the aqueous liquid, for example by centrifugation or by drying.

Generally, the layered silicate of the invention delaminates in an aqueous environment essentially completely. If so desired, minor impurities of non-delaminated material may be removed by suitable separation processes, for example by centrifugation.

In some embodiments, the process of preparing the layered silicate includes one or more washing steps with water. In exemplary embodiments, the layered silicate is washed with water or an aqueous washing liquid before or after treatment with a protonated amino acid. In some embodiments, the conductivity of an aqueous dispersion of the layered silicate can be reduced by known methods, such as by dialysis or by centrifugation followed by removal of the supernatant, and replacement of the supernatant by deionized water.

As mentioned above, the layered silicate of the invention is very suitable for improving the barrier properties of composite materials. Therefore, the invention also relates to a composition comprising at least one binder and the layered silicate of the invention.

The binder is generally a material capable of forming a layer on a substrate.

Examples of binders include organic polymers and resins, prepolymers, and monomers capable of forming a polymer. The binder may be of natural or synthetic origin, or it may be a synthetically modified natural material. Examples of binders are polyurethanes, polycarbonates, polyamides, polyacrylates, polyesters, polyolefins, rubber, polysiloxanes, polyvinylalcol, polylactides, polysaccharides, poly-lysine, polystyrene, polyalkylene oxides, and polyepoxides, and combinations thereof.

It is preferred that the binder comprises at least one of an aqueous polymer solution or an aqueous polymer dispersion. Polymers for aqueous media often contain cationic or anionic groups. Examples of binders in an aqueous medium include proteins, polysaccharides, poly-lysine, polyacrylates, polyvinylesters, polyvinylalcohol, polyethylene oxide, oxidized polyolefins, and maleinized polyolefins, and combinations thereof.

In some embodiments, the composition is a liquid composition, which can be applied as a coating to a substrate. When the liquid composition comprises water or an organic solvent as diluent, the composition dries after application to a substrate by evaporation of water or solvent to form a coating layer.

The substrate to be coated can be any suitable substrate to receive a coating layer. Examples of suitable substrate materials are polymers, such as polyesters, polyacrylates, polyvinylchloride, and polyolefins, as well as paper, cardboard, wood, textile material, and metals. In some embodiments, the substrate is a polymer foil, for example a polymer foil suitable for food packaging. In other embodiments, the substrate may be in the form of a tray, container or bottle suitable for packaging of food or beverages. In still further embodiments, the substrate may be a metal substrate to be protected against corrosion, such as an iron, steel, or copper or aluminum substrate. The substrate may also be present in the form of a laminate, comprising two or more layers of different materials. Furthermore, the coating layer may itself form an inner our outer layer in a multi-layer material.

The weight ratio of binder to the layered silicate of the invention in the composition is generally in the range of 3:97 to 97:3, preferably 7:93 to 93:7.

Incorporation of the layered silicate of the invention into a binder can be carried out by means of conventional techniques such as, for example, mixing, stirring, extrusion, kneading processes, rotor-stator processes (Dispermat, Ultra-Turrax, etc.), grinding processes or jet dispersion and is dependent on the viscosity of the binder.

In a further embodiment, the invention relates to the use of the layered silicate according to the invention for improving the barrier properties of a polymer layer or of a coating layer. When included in a polymer layer or coating layer, the layered silicate of the invention significantly improves the barrier properties of the layer. Relevant barrier properties include the permeation of gases and liquids through the layer. Improved barrier properties mean that the permeation of gases, liquids, fats, greases, fragrances, and other materials through the layer is reduced. Examples of gases for which the permeation is reduced include oxygen, carbon dioxide and -monoxide, water vapor, helium, argon, hydrogen, and nitrogen. Reducing the permeation is of particular importance in the field of packaging for food and beverage.

The layered silicate of the invention is furthermore suitable for improving flame-retardant properties of polymers and potentially flammable organic matrix materials. In typical embodiments, the layered silicate of the invention is mixed with a polymer or organic matrix material, to provide a composite material comprising a polymer or organic matrix material wherein the layered silicate of the invention is distributed in the form of particles. In some embodiments, the particle number per unit volume is at least about 2 particles per 100 $\mu m^3$, for example at least about 5 particles per 100 $\mu m^3$, for example at least about 8 particles per 100 $\mu m^3$, for example at least about 10 particles per 100 $\mu m^3$, for example at least about 15 particles per 100 $\mu m^3$ or at least about 20 particles per 100 $\mu m^3$. Examples of suitable matrix materials and polymers include natural or synthetic polymer or mixture thereof. The polymer may, for example, be thermoplastic or thermoset. The term "polymer" used herein includes homopolymers and copolymers, as well as cross-linked and/or entangled polymers and elastomers such as natural or synthetic rubbers and mixtures thereof. Specific examples of suitable polymers include, but are not limited to, polyolefins of any density such as polyethylene and polypropylene, polycarbonate, polystyrene, polyester, acrylonitrile-butadiene-styrene copolymer, nylons, polyurethane, ethylene-vinylacetate polymers, and any mixture thereof, whether cross-inked or un-cross-linked. Other organic matrix materials include resins and bitumen. In addition to the layered silicate of the invention, other known flame-retardant additive may be present, for char forming agents, drip suppressants, heat absorbers, and ignition suppressants.

Articles which may be formed from the compositions are many and various. Examples include sheaths for electrical cables, electrical cables coated or sheathed with the polymer composition, and housings and plastics components for electrical appliances (e.g. computers, monitors, printers, photocopiers, keyboards, pagers, telephones, mobile phones, hand-held computers, network interfaces, plenums and televisions), as well as roofing felt.

EXAMPLES

Example 1.1

Step a)

A layered material of the formula $Na_{0.6}[Mg_{2.4}Li_{0.6}]Si_4O_{10}F_2$ was prepared from a mixture of sodium carbonate (82.23 g, purity 99.9%), Lithium carbonate (57.33 g, purity 99.9%), Magnesium oxide (145.95.8 g, purity 98.0%), Magnesium fluoride (161.15 g, purity 99.9%), and silicon dioxide (621.63 g, purity 99.9%). The raw material mixture was heated in a platinum crucible to 1530° C. to form a homogeneous melt and kept at this temperature for 2 hours. After this time the melt was poured into a ceramic crucible. The ceramic crucible with the melt was placed in an oven and cooled to a temperature of 400° C. during a period of 6 hours.

Step b)

After cooling to room temperature, 5.0 g of the layered material prepared in step a) was dispersed in 95.0 g of distilled water by stirring. The aqueous dispersion was heated to a temperature of 80° C., L-Lysine hydrochloride was added to the dispersion of the Sodium Layered silicate. The amount of Lysine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool of S25N 18 G at a speed of 10000 rpm for a period of 10 minutes. Subsequently, the dispersion was dried by evaporation of water and the residue was ground to a powder.

The powder was analyzed by SAXS as described above. The d-spacing was found to be 430 Å, indicating complete delamination.

Example 1.2

Example 1.2 was prepared analogously to Example 1.1. However, in place of L-Lysine hydrochloride use was made of D-Lysine hydrochloride.

Example 2

After cooling to room temperature, 5.0 g of the layered material prepared in step a) of Example 1 was dispersed in 95.0 g of distilled water by stirring. The aqueous dispersion was heated to a temperature of 80° C., L-Ornithine hydrochloride was added to the dispersion of the Sodium Layered silicate. The amount of L-Ornithine hydrochloride was equal to 40% of the cation exchange capacity of Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 3

After cooling to room temperature, 5.0 g of the layered material prepared in step a) of Example 1 was dispersed in 95.0 g of distilled water by stirring. The aqueous dispersion was heated to a temperature of 80° C., L-Lysine hydrochloride was added to the dispersion of the Sodium Layered silicate. The amount of L-Lysine hydrochloride was equal to 60% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 4

After cooling to room temperature, 5.0 g of the layered material prepared in step a) of Example 1 was dispersed in 95.0 g of distilled water by stirring. The aqueous dispersion was heated to a temperature of 80° C., L-Ornithine hydrochloride was added to the dispersion of the Sodium Layered silicate. The amount of L-Ornithine hydrochloride was equal to 60% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 5

Step a)

A layered material of the formula $Na_{0.65}[Mg_{2.35}Li_{0.65}]Si_4O_{10}F_2$ was prepared from a mixture of sodium carbonate (89.03 g, purity 99.9%), Lithium carbonate (62.06 g, purity 99.9%), Magnesium oxide (140.46 g, purity 98.0%), Magnesium fluoride (161.03 g, purity 99.9%), and silicon dioxide (621.63 g, purity 99.9%). The raw material mixture was heated in a platinum crucible to 1530° C. to form a homogeneous melt and kept at this temperature for 2 hours. After this time the melt was poured into a ceramic crucible. The ceramic crucible with the melt was placed in an oven and cooled to a temperature of 400° C. during a period of 6 hours.

Step b)

After cooling to room temperature, 5.0 g of the layered material prepared in step a) was dispersed in 95.0 g of distilled water by stirring. The aqueous dispersion was heated to a temperature of 80° C., L-Lysine hydrochloride was added to the dispersion of the Sodium Layered silicate. The amount of L-Lysine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 6

After cooling to room temperature, 5.0 g of the layered material prepared in step a) of Example 5 was dispersed in 95.0 g of distilled water by stirring. The aqueous dispersion was heated to a temperature of 80° C., L-Ornithine hydrochloride was added to the dispersion of Sodium Layered silicate. The amount of L-Ornithine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 7

After cooling to room temperature, 5.0 g of the layered material prepared in step a) of Example 5 was dispersed in 95.0 g of distilled water by stirring. The aqueous dispersion was heated to a temperature of 80° C., L-Lysine hydrochloride was added to the dispersion of Sodium Layered silicate. The amount of L-Lysine hydrochloride was equal to 60% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 8

After cooling to room temperature, 5.0 g of the layered material prepared in step a) of Example 5 was dispersed in 95.0 g of distilled water by stirring. The aqueous dispersion was heated to a temperature of 80° C., L-Ornithine hydrochloride was added to the dispersion of the Sodium Layered silicate. The amount of L-Ornithine hydrochloride was equal to 60% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 9

Step a)

A layered material of the formula $Na_{0.80}[Mg_{2.2}Li_{0.8}]Si_4O_{10}F_2$ was prepared from a mixture of sodium carbonate (109.33 g, purity 99.9%), Lithium carbonate (76.22 g, purity 99.9%), Magnesium oxide (124.74 g, purity 98.0%), Magnesium fluoride (160.68. g, purity 99.9%), and silicon dioxide (619.83 g, purity 99.9%). The raw material mixture was heated in a platinum crucible to 1530° C. to form a homogeneous melt and kept at this temperature for 2 hours. After this time the melt was poured into a ceramic crucible. The ceramic crucible with the melt was placed in an oven and cooled to a temperature of 400° C. during a period of 6 hours.

Step b)

After cooling to room temperature, 5.0 g of the layered material prepared in step a) was dispersed in 95.0 g of distilled water by stirring. The aqueous dispersion was heated to a temperature of 80° C., β-Alanine hydrochloride was added to the dispersion of the Sodium Layered silicate. The amount of β-Alanine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 10

After cooling to room temperature, 5.0 g of the layered material prepared in step a) of Example 9 was dispersed in 95.0 g of distilled water by stirring. The aqueous dispersion was heated to a temperature of 80° C., β-Alanine hydrochloride was added to the dispersion of the Sodium Layered silicate. The amount of β-Alanine hydrochloride was equal to 80% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 11

After cooling to room temperature, 5.0 g of the layered material prepared in step a) of Example 9 was dispersed in 95.0 g of distilled water by stirring. The aqueous dispersion was heated to a temperature of 80° C., L-Ornithine hydrochloride was added to the dispersion of the Sodium Layered silicate. The amount of L-Ornithine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 12

After cooling to room temperature, 5.0 g of the layered material prepared in step a) of Example 9 was dispersed in 95.0 g of distilled water by stirring. The aqueous dispersion was heated to a temperature of 80° C., L-Lysine hydrochloride was added to the dispersion of the Sodium Layered silicate. The amount of L-Lysine hydrochloride was equal to 40% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 13 (Comparative)

After cooling to room temperature, 5.0 g of the layered material prepared in step a) of Example 1 was dispersed in 95.0 g of distilled water by stirring. The aqueous dispersion was heated to a temperature of 80° C., L-Lysine hydrochloride was added to the dispersion of the Sodium Layered silicate. The amount of L-Lysine hydrochloride was equal to 150% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

Example 14 (Comparative)

After cooling to room temperature, 5.0 g of the layered material prepared in step a) of Example 5 was dispersed in 95.0 g of distilled water by stirring. The aqueous dispersion was heated to a temperature of 80° C., L-Ornithine hydrochloride was added to the dispersion of the Sodium Layered silicate. The amount of L-Ornithine hydrochloride was equal to 150% of the cation exchange capacity of the Sodium Layered silicate. The pH of the dispersion was adjusted to 5-6. The temperature of the dispersion was held for 45 minutes. The heated dispersion was treated with an IKA ULTRA-TURRAX® T 25 with a dispersion tool S25N 18 G at a speed of 10000 rpm for a period of 10 minutes. Subsequently, the dispersion was dried by evaporation of water and the residue was ground to a powder.

The layered materials prepared are summarized in Table 1 below.

TABLE 1

| Sample name | CEC meq/ 100 g | Amino acid type | Amount of amino acid hydrochloride added as % CEC | | Amount of layered material (g) |
|---|---|---|---|---|---|
| | | | In g | | |
| Example 1.1 | 140 | L-Lysine | 40 | 0.51 | 5 |
| Example 1.2 | 140 | D-Lysine | 40 | 0.51 | 5 |
| Example 2 | 140 | L-Ornithine | 40 | 0.47 | 5 |
| Example 3 | 140 | L-Lysine | 60 | 0.77 | 5 |
| Example 4 | 140 | L-Ornithine | 60 | 0.71 | 5 |
| Example 5 | 148 | L-Lysine | 40 | 0.54 | 5 |
| Example 6 | 148 | L-Ornithine | 40 | 0.50 | 5 |
| Example 7 | 148 | L-Lysine | 60 | 0.81 | 5 |
| Example 8 | 148 | L-Ornithine | 60 | 0.75 | 5 |
| Example 9 | 175 | β-Alanine | 40 | 0.44 | 5 |
| Example 10 | 175 | β-Alanine | 80 | 0.88 | 5 |
| Example 11 | 175 | L-Lysine | 40 | 0.64 | 5 |
| Example 12 | 175 | L-Ornithine | 40 | 0.59 | 5 |
| Example 13 (comparative) | 140 | L-Lysine | 150 | 1.92 | 5 |
| Example 14 (comparative) | 146 | L-Ornithine | 150 | 1.87 | 5 |

Application of (Sodium/Amino Acid)-Layered Silicates in Barrier Formulations
Barrier Formulations of (Sodium/Amino Acid)-Layered Silicate with PVOH, EVOH.

(Sodium/amino acid)-Layered silicate as indicated in Table 2 was dispersed in deionized water with a solid content of 5 wt %. A solution of the polymer ((EVOH, ethylene vinyl alcohol copolymer, available from Kuraray EXCEVAL AQ 4104) or PVOH, polyvinyl alcohol, available sigma Aldrich (Mowiol 28-98)) was prepared by heating of the polymer solid in deionized water at 85° C. for 60 minutes. The respective polymer solution was added to the dispersion of (Sodium/amino acid)-Layered silicate to achieve 5 wt % total solid content. The ratio of (Sodium/amino acid)-Layered silicate to polymer was adjusted to have 10 wt % of the layered silicate in the dry film. A K-hand coater was used to apply the dispersion of (Sodium/amino acid)-Layered silicate and polymer on a PET (polyethylene terephthalate) film of 36 μm thickness. The wet film thickness of the applied coating layer was 24 μm. The coating was dried at 80° C. for 6 h. The thickness of the dry coating film was about 1 μm, unless mentioned otherwise in Table 2. The oxygen transmission rate was measured using an OX-TRAN® Model 1/50 at 23° C. and 75 wt % relative humidity. The water vapor transmission rate was measured at 75 wt % relative humidity using a PERMATRAN-W Model 1/50.

Barrier Formulations of (Sodium/Amino Acid)-Layered Silicate with Polyurethane Dispersions (Sodium/amino acid)-Layered silicate as indicated in Table 2 was dispersed in deionized water with a solid content of 5 wt %. The polymer dispersion of polyurethane (LIOPUR 2004-151 and LIOPUR PFL 2392 are available from Synthopol Chemie), was added to the dispersion of (Sodium/amino acid)-Layered silicate to achieve 5 wt % total solid content. The ratio of (Sodium/amino acid)-Layered silicate to polymer was adjusted to have 95 wt % (5% is cellulose or Dextrin) in the dry film. A K-hand coater was used to apply the dispersion of (Sodium/amino acid)-Layered silicate and polymer on a PET (polyethylene terephthalate) film of 36 μm) thickness. The coating was dried at 80° C. for 6 h. The thickness of the dry coating film was about 1 μm. The oxygen transmission rate was measured using an OX-TRAN® Model 1/50 at 23° C. and 75% relative humidity. The water vapor transmission rate was measured at 75% relative humidity using a PERMATRAN-W Model 1/50.

TABLE 2

| Layered Material | Polymer type | OTR cc · m$^{-2}$ · day$^{-1}$ | WVTR g · m$^{-2}$ · day$^{-1}$ |
|---|---|---|---|
| Example 1.1 | Mowiol 28-98 | 0.41 | 0.61 |
| Example 1.1 | EXCEVAL AQ 4104 | 0.39 (4 μm dry film) | 0.33 (4 μm dry film) |
| Example 1.2 | Mowiol 28-98 | 0.52 | 0.70 |
| Example 2 | Mowiol 28-98 | 0.32 | 0.58 |
| Example 3 | Mowiol 28-98 | 0.80 | 1.20 |
| Example 4 | Mowiol 28-98 | 0.60 | 0.90 |
| Example 5 | Mowiol 28-98 | 0.38 | 0.61 |
|  | EXCEVAL AQ 4104 | 0.22 (4 μm dry film) | 0.50 (4 μm dry film) |
|  | LIOPUR 2004-151 | 3.00 (4 μm dry film) | 1.70 (4 μm dry film) |
|  | LIOPUR PFL 2392 | 2.90 (4 μm dry film) | 1.50 (4 μm dry film) |
|  | Cellulose (CAS: 9004-34-6, Alfa Aesar) | 1.31 | 1.03 |
|  | 2-Hydroxyethyl Cellulose (CAS: 9004-62-0, Sigma Aldrich) | 0.86 | 0.95 |
|  | Methylcellulose (CAS: 9004-67-5 ) | 1.10 | 0.99 |
|  | (Hydroxypropyl)methyl cellulose (CAS: 9004-65-3, Sigma Aldrich) | 0.86 | 1.12 |
|  | Dextrin (CAS: 9004-53-9) | 0.79 | 1.03 |
| Example 6 | Mowiol 28-98 | 0.20 | 1.10 |
| Example 7 | Mowiol 28-98 | 1.20 | 1.20 |
| Example 8 | Mowiol 28-98 | 6.10 | 1.40 |
| Example 9 | Mowiol 28-98 | 8.4 | 2.0 |
| Example 10 | Mowiol 28-98 | 9.0 | 1.7 |
| Example 11 | Mowiol 28-98 | 6.30 | 1.20 |
| Example 12 | Mowiol 28-98 | 5.50 | 1.40 |
| Example 13* | Mowiol 28-98 | 22.50 | 2.60 |
| Example 14* | Mowiol 28-98 | 21.60 | 2.40 |
| Example 1a* | Mowiol 28-98 | 21.70 | 2.60 |
| Example 5a* | Mowiol 28-98 | 21.30 | 2.40 |
| Example 9a* | Mowiol 28-98 | 23.50 | 2.80 |
| PET foil* | — | 28.00 | 3.40 |

Examples with an * indicate comparative examples.

(Sodium/amino acid)-Layered silicate to achieve 5 wt % total solid content. The ratio of (Sodium/amino acid)-Layered silicate to polymer was adjusted to have 50 wt % of the layered silicate in the dry film. A K-hand coater was used to apply the dispersion of (Sodium/amino acid)-Layered silicate and polymer on a PET (polyethylene terephthalate) film of 36 μm thickness. The coating was dried at 80° C. for 6 h. The thickness of the dry coating film was about 1 μm, unless mentioned otherwise in Table 2. The oxygen transmission rate was measured using an OX-TRAN® Model 1/50 at 23° C. and 75 wt % relative humidity. The water vapor transmission rate was measured at 75 wt % relative humidity using a PERMATRAN-W Model 1/50.

Barrier Formulations of (Sodium/Amino Acid)-Layered Silicate with Cellulose and Dextrin (Sodium/amino acid)-Layered silicate as indicated in Table 2 was dispersed in deionized water with a solid content of 5 wt %. The polymer solution of Cellulose or Dextrin was added to the dispersion of (Sodium/amino From Table 2 it can be concluded that the layered materials of the invention provide largely improved barrier properties in comparison to layered materials wherein the inorganic interlayer cations have been completely exchanged with amino acids (Examples 13 and 14) or wherein no exchange of inorganic interlayer cations occurred (Examples 1a, 5a, 9a).

The invention claimed is:

1. A layered silicate having interlayer cations, wherein the interlayer cations comprise
    a) inorganic monovalent cations comprising at least one of $Na^+$, $K^+$, and $Li^+$, and
    b) organic cations comprising at least one protonated amino acid,
    wherein the molar ratio of the inorganic monovalent cations a) to organic cations b) is in the range of 0.20:0.80 to 0.80:0.20.

2. The layered silicate according to claim 1, wherein the layered silicate is a synthetic layered silicate.

3. The layered silicate according to claim 1, wherein the layered silicate is a naturally occurring layered silicate modified with a protonated amino acid.

4. The layered silicate according to claim 1, wherein the protonated amino acid comprises at least one of lysine, ornithine, and alanine.

5. The layered silicate according to claim 1, wherein the interlayer cations between the layers alternately comprise more than 60 mole-% of protonated amino acids and more than 60 mole-% of inorganic cations selected from $Na^+$, $K^+$, and $Li^+$.

6. A process for preparing a layered silicate having interlayer cations, comprising
   i) providing a layered silicate,
   ii) determining the cation exchange capacity of the layered silicate
   iii) contacting the layered silicate with a protonated amino acid in an aqueous environment, wherein the molar amount of protonated amino acid corresponds to less than 100% of the cation exchange capacity of the layered silicate,
   the resulting layered silicate having interlayer cations, wherein the interlayer cations comprise
   a) inorganic monovalent cations comprising at least one of $N^+$, $K^+$, and $Li^+$ and
   b) organic cations comprising at least one protonated amino acid,
   wherein the molar ratio of the inorganic monovalent cations a) to organic cations b) is in the range of 0.20:0.80 to 0.80:0.20.

7. The process according to claim 6, wherein the protonated amino acid comprises at least one lysine, ornithine, and alanine.

8. The process according to claim 6, wherein the layered silicate provided in step i) has the composition $Na_x[Mg_{3-z}Li_y]Si_4O_{10}(T)_2$, wherein
   x is in the range of 0.40 to 0.90,
   y is in the range of 0.00 to 0.90,
   z is in the range of 0.20 to 0.90,
   T independent of each occurrence represents F or OH, and $x+(3-z)+y \leq 4$.

9. The process according to claim 6, further comprising a step of drying the layered silicate after treatment with protonated amino acid.

10. A composition comprising at least one binder and the layered silicate according to claim 1.

11. The composition according to claim 10, wherein the binder comprises a polymer.

12. The composition according to claim 11, wherein the binder comprises at least one of an aqueous polymer solution and an aqueous polymer dispersion.

13. The layered silicate according to claim 1, wherein the molar ratio of the inorganic monovalent cations a) to organic cations b) is in the range of 0.75:0.25 to 0.30:0.70.

14. The layered silicate according to claim 1, wherein the molar ratio of the inorganic monovalent cations a) to organic cations b) is in the range of 0.70:0.30 to 0.35:0.65.

\* \* \* \* \*